United States Patent [19]

Allen

[11] Patent Number: 5,208,847
[45] Date of Patent: May 4, 1993

[54] METHOD OF INCREASING CAPACITY OF CELLULAR NETWORK

[75] Inventor: Daniel L. Allen, McKinney, Tex.

[73] Assignee: Northern Telecom Limited, Montreal, Canada

[21] Appl. No.: 659,939

[22] Filed: Feb. 25, 1991

[51] Int. Cl.⁵ .......................................... H04M 11/00
[52] U.S. Cl. ...................................... 379/59; 379/63; 455/33.1
[58] Field of Search ............... 379/59, 63, 60; 455/33, 455/33.1, 33.2, 33.4

[56] References Cited

U.S. PATENT DOCUMENTS

| | | | |
|---|---|---|---|
| 4,775,998 | 10/1988 | Felix et al. | 379/59 |
| 4,799,253 | 1/1989 | Stern et al. | 379/59 |
| 4,893,327 | 1/1990 | Stern et al. | 379/59 |

Primary Examiner—Curtis Kuntz
Assistant Examiner—Dwayne D. Bost
Attorney, Agent, or Firm—Shlesinger, Arkwright & Garvey

[57] ABSTRACT

A method of capping an existing cellular network such that a new system can operate in tandem with an existing cellular network without disrupting service to existing subscribers and without requiring the replacement of existing equipment. This is achieved by giving control of all dedicated control channels (CCHs) in each cell to a second switch. The second switch thereby is provided with the control of call setups, thus providing for more than one category of mobile subscriber. Some subscribers can be serviced by the existing switch and others by the second switch.

7 Claims, 4 Drawing Sheets

METHOD OF INCREASING CAPACITY OF CELLULAR NETWORK

FIELD OF THE INVENTION

The present invention relates to cellular radiotelephone systems and more particularly to a method and apparatus for improving the load capacity of an existing cellular network.

BACKGROUND OF THE INVENTION

Today's cellular networks are single-vendor systems with proprietary switch/cell-site interfaces that constrain network operators to grow by purchasing equipment from the same vendor that provided their initial equipment. With the recent growth of cellular services, network operators can augment the load capacity of their cellular system by either having the original vendor upgrade the existing system or by having another vendor install a new more powerful system which replaces the existing system.

Since the interface of a base station to a Mobile Telephone Switching Office (MTSO) is proprietary to a vendor, the introduction of a new system by another vendor often requires the installation of new base stations and switching offices to replace existing equipment. Cellular network operators in major service areas are reluctant to completely replace their existing vendor's equipment with a new vendor's equipment. The network operators perceive that a complete replacement could be too costly and too risky to undertake. Further, their system would remain a single vendor network. In order to make the transition as cost effective as possible, the new system must therefore operate in tandem with the old system. This is accomplished by having the new network overlay the old one.

However, since the two networks are incompatible, some problems can arise with call handling between subscribers. Each switching office will often have to handle calls according to the source and destination of each call and of course, the type of subscriber.

Thus, if a new vendor's equipment is to co-exist with the original vendor's equipment, subscribers must perceive no significant reduction in service quality or availability and cellular network operators must not be required to replace undepreciated capital equipment where it can be avoided.

The problem of increasing the load capacity of an existing network is addressed in U.S. Pat. No. 4,799,253 which issued to Stern et al. In this invention, the existing cellular system is interconnected with a new cellular system to provide additional switching capacity to mobiles located in the same geographical area. The existing system has a control terminal coupled to the base stations, to the new control terminal via a one-way inter-office trunk and to a central office via an out trunk. The new control system is coupled to new base stations in the same geographical area as the existing base stations. The new control system is coupled to the central office via in and out trunks. Paging/Access channels are assigned to all new base stations, whereas the existing base stations are assigned Access only channels. The load of mobile originated calls is shared between the two systems by sending a percentage of mobile originated calls to the existing system and remaining calls to the new system.

The problem with this approach, is that the switches are only used to offload mobile originated calls to the new switch. That is, all calls directed to the mobiles are handled by the new switch and all pages transmitted and received to and from the mobiles are processed by the new switch. The result is that the new switch can be constrained with a large processing load, whereas the existing switch may become underutilized.

In addition, a certain limitation can exist with this approach. In particular, since both switches may from time to time serve a given mobile, signalling for vertical features must be identical on both switches to avoid subscriber confusion. For example, certain features such as the flash sequences for conference calling can be problematic. Cellular feature access codes and keystroke procedures should be identical to the landline (Bellcore) standards. For example, "*xy" should mean "call forward all calls to the following DN" in any network.

Accordingly, it is an object of the present invention to provide to a network operator a method of increasing the capacity of an existing network by operating a new cellular system in tandem with an existing system without disrupting service to existing subscribers.

Another object of the present invention is to provide a network operator with a method of balancing load between an existing network and a new network.

SUMMARY OF THE INVENTION

The present invention provides a service provider or network operator an ability to provide a balanced increase of the capacity provided between an existing cellular network and a new network, without disrupting existing service. This is achieved even though the existing system and the second system may not be from the same vendor. This is provided by giving control of all dedicated control channels (CCH) in each cell to the second switch and assigning calls from and to a first group of subscribers to the existing switch and calls from and to a second group of subscribers to the new switch. The first and second group of subscribers are identified according to their MIN (Mobile Identification Number).

It is therefore an aspect of the present invention to provide a method of increasing the capacity of a cellular network having a plurality of cells with at least one base station in each cell and a mobile telephone switching office (MTSO) connected to a public network (PSTN), comprising the steps of:

a) decoupling incoming trunks between said MTSO and said PSTN;

b) coupling in and out trunks between said PSTN and a second switching office (SSO);

c) coupling inter-office trunks from said SSO to said MTSO, and from said MTSO to said SSO;

d) placing, in each cell, new base stations associated with said SSO along with the base station associated with said MTSO;

e) assigning a first group of subscribers having a Mobile Identification Number (MIN) with a least significant bit equal to a first binary digit, for service with said MTSO;

f) assigning a second group of subscribers having a MIN with a least significant bit equal to a second binary digit, for service with said SSO;

g) assigning for each cell a paging/access control channel associated with said SSO such that calls directed to said first or second group of subscribers and calls originating from said second group of subscribers are set-up by said SSO; and h) assigning for each cell an access/paging control channel associated with said MTSO, such that calls originating from said first group of subscribers are set-up by said MTSO.

DETAILED DESCRIPTION OF THE PREFERRED EMBODIMENT

Figure 1:
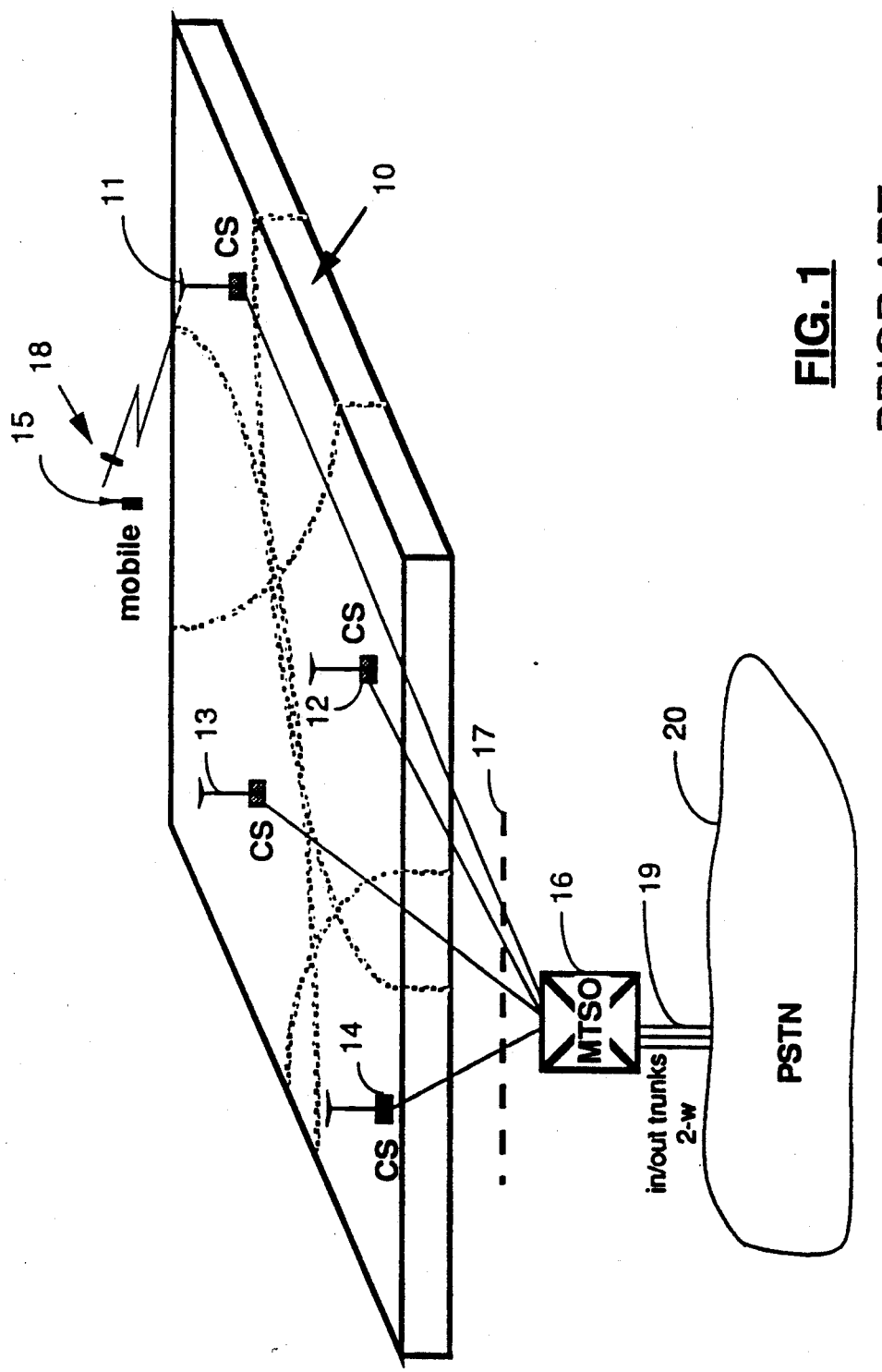
FIG. 1 is an illustration of an existing single vendor cellular network.

Referring now to FIG. 1, we have shown a cellular serving area 10, which provides a cellular service by means of a number of cell sites 11, 12, 13 and 14, which are located at various locations in serving area 10 according to the need of the service or network operator. Communication between a mobile subscriber 15 and the Mobile Telephone Switching Office (MTSO) 16 is done using one of the cell sites located near the subscriber. The interface 17 between the MTSO 16 and each cell-site is a proprietary interface, i.e. which operates on a protocol usable only with that vendor's equipment. The RF link 18 between mobile subscriber 15 and cell site 11 consists of the EIA-553 protocol which has been adopted as a standard for analog cellular networks. In and out trunks 19 are used to connect the MTSO 16 to the Public Switch Telephone Network (PSTN) 20. With this type of network architecture, the cellular network operator is limited to a single vendor for increasing the capacity of the network or providing enhanced services.

Figure 2:
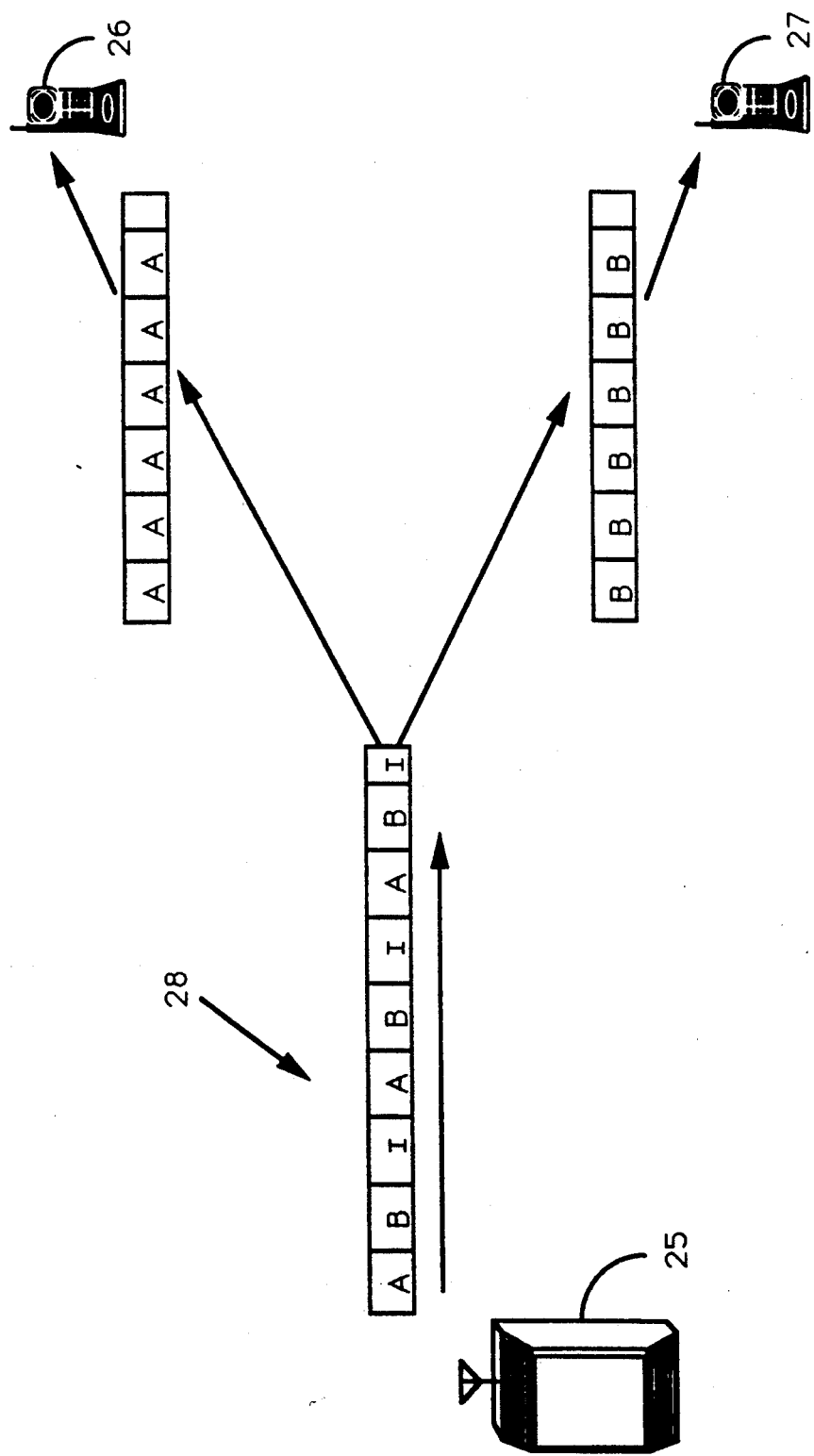
FIG. 2 illustrates the forward control channel protocol of the EIA-553 analog cellular standard.

As illustrated in FIG. 2, the present invention makes use of the fact that all subscriber mobiles receive and send information between a base station 25 and a first and second mobile telephone 26 and 27, according to a standard protocol provided in the analog cellular telephone standard EIA-553. The standard calls for a forward control channel 28 consisting of three (3) discrete information streams, called stream A, stream B and busy-idle stream I, that are multiplexed together. Mobile units having a Mobile Identification Number (MIN) with a least significant bit equal to 0 use one stream for receiving messages. Those with a least significant bit equal to 1 use the other. With the present invention, the cellular network is set-up such that the existing switch would serve subscribers in one group (either stream A or B) and the second switch would serve the remaining subscribers.

Figure 3:
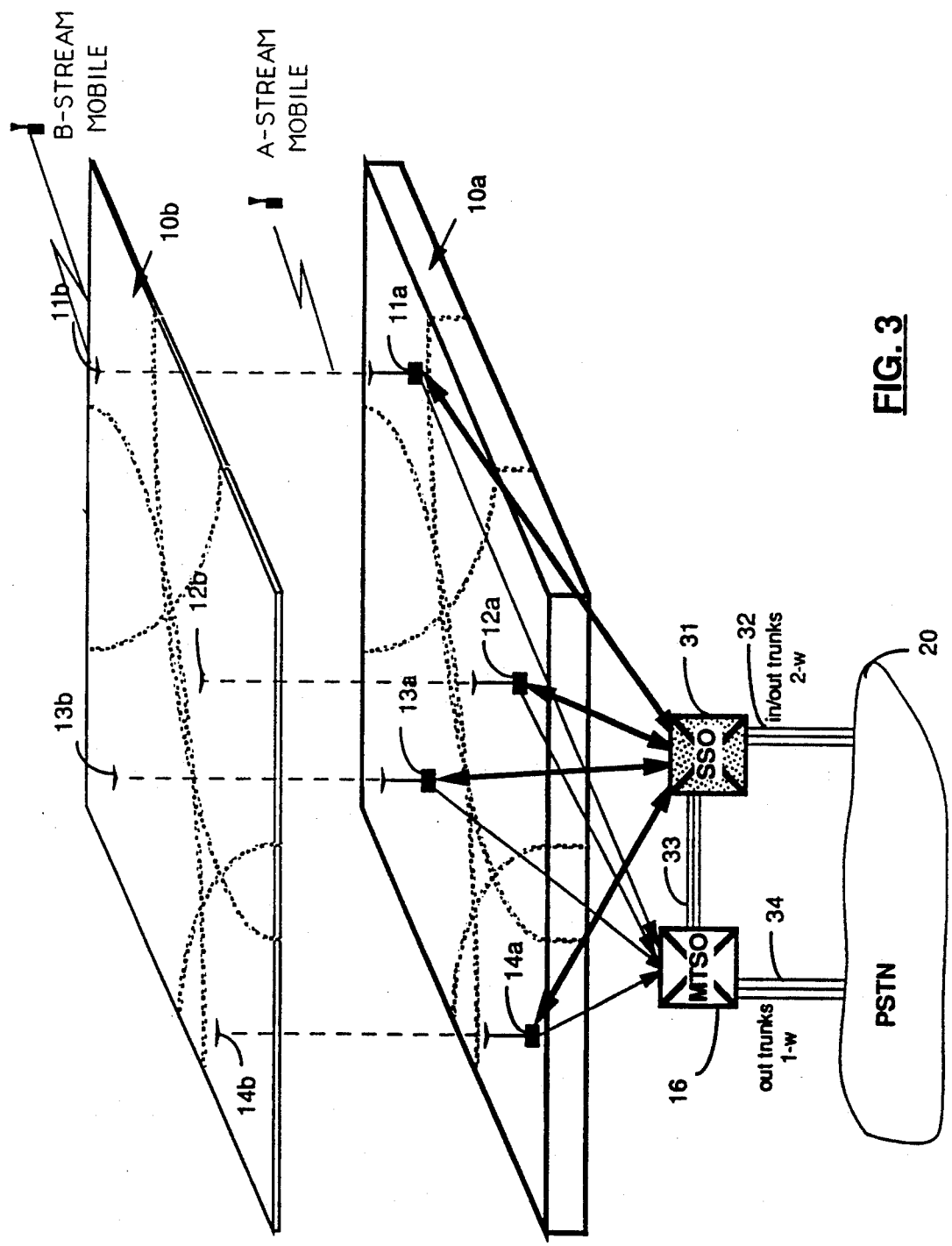
FIG. 3 is an illustration of a multi-vendor cellular network according to the preferred embodiment of the present invention.

In the illustration of FIG. 3, a second vendor can provide additional balanced services to the existing network 10a with an overlay network 10b, by assigning a first group of subscribers, in this case those that receive on stream A, to the existing network 10a and those that receive on stream B to the overlay network 10b. A Second Switching Office (SSO) 31 is placed in control of the paging/access control channels (CCHs) in each cell, thereby, giving the SSO control of paging. This is accomplished by decoupling the in trunk of the MTSO 16 and coupling only the out trunk 34 from the MTSO 16 to the PSTN. In/out trunks 32 from the SSO 31 are coupled to the PSTN 20. A number of inter-office trunks 33 are coupled from the SSO 31 to the MTSO 16 and from the MTSO 16 to the SSO 31. Each cell site base station 11a, 12a, 13a and 14a associated with the MTSO 16 is provided with a second base station 11b, 12b, 13b and 14b associated with the SSO 31. With this arrangement, wherein the CCHs are in the overlay network 10b, the SSO 31 controls the system by controlling the paging of all mobiles and A-stream voice channel access. The paging/access channel of the MTSO is set up either by removing the paging channel or by disabling that channel, such that only the access channel is in operation. In effect, the CCH of the MTSO are arranged such that no mobile will scan and lock onto any of the paging channels of the MTSO to monitor for paging messages. This requirement can be met by setting the CCHs as described above, by provisioning the MTSO's access-only channels outside the dedicated 21 control channels or by provisioning the CCH transmitters such that they are disabled or "mistuned" to operate on appropriate frequencies. Thus, the MTSO would operate what it believes were combined page/access control channels in the dedicated 21 CCHs in a way that all mobiles in the system would see as access-only CCHs.

Figure 4:
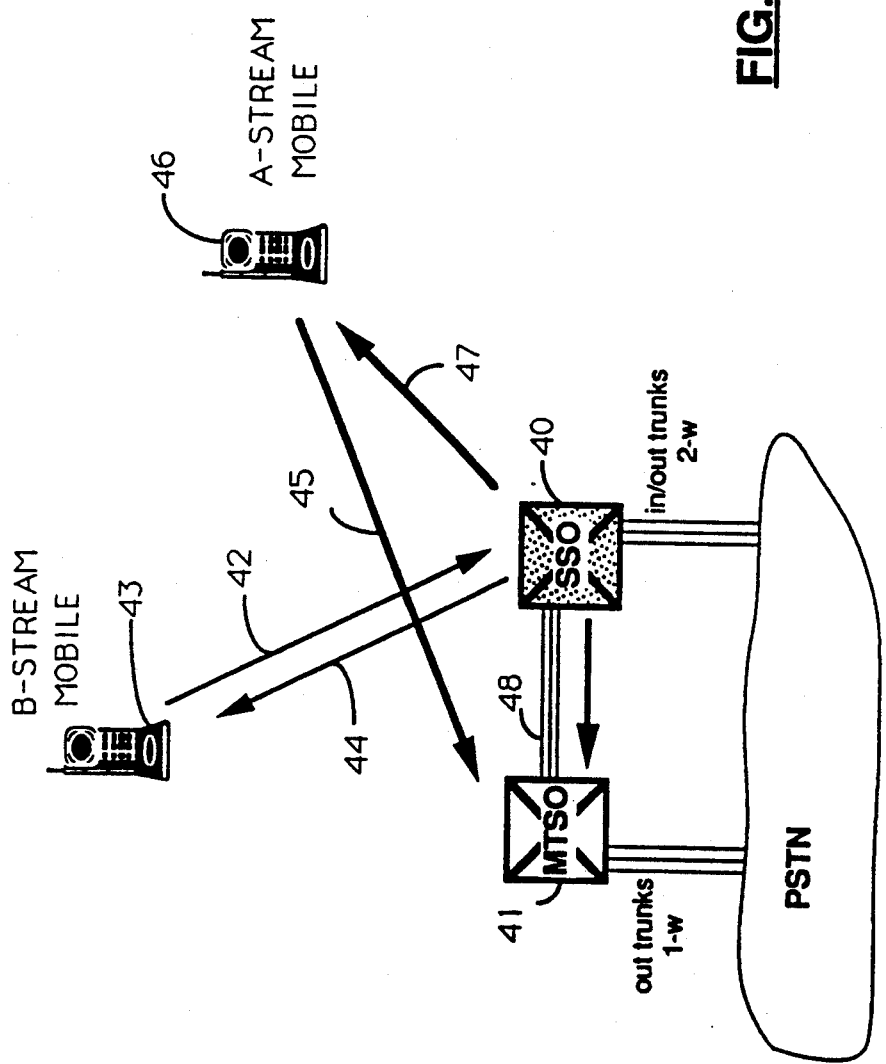
FIG. 4 illustrates the call set-up procedures for a multi-vendor cellular network according to the preferred embodiment of the present invention.

Referring now to FIG. 4, in operation, the subscribers are divided into a set to be serviced by the SSO 40 and a set to be serviced by the MTSO 41. For example, calls to mobiles can be received either on stream A or B. In the present embodiment, when a subscriber assigned to the B stream attempts to originate a call 42, the SSO 40 handles the call setup on the paging/access CCHs and then services the call on its set of voice channels (VCs). The SSO's VCs and the paging/access CCHs would be transceived by base stations 11b, 12b, 13b and 14b (see FIG. 3). Similarly, when the subscriber 43 receives an incoming call 44, the SSO would also handle the call set-up on the dedicated paging/access CCHs. For example, under the EIA-553 forward control channel protocol, mobile stations with least significant bits of their MIN's equal to '0' are sent on stream A, and those with the least-significant bit of their MIN's equal to '1' are sent on stream B. Thus, if the SSO sends the New Access (NEWACC) control message on one stream, say the B stream, all mobiles for whom the least significant bit of their MIN is 1 will hear the NEWACC control message. The other mobiles will not hear the message. Thus, control messages can be sent out by the SSO 40 such that "half" 0 the mobiles hear certain messages and the other "half" don't. When the A-stream mobiles attempt to access the access control channels to originate a call or to respond to a page, they will receive the control message (NEWACC or New Access Channel Set Global Action) and attempt to access the system on one of the access control channels given in the control message. If the SSO controls all the paging access control channels, it will setup any call by a B-stream mobile. The result is a partitioning of load calls between the SSO and the MTSO.

A call 45 from an A-stream subscriber 46 is set-up by the MTSO 41. A call 47 to the A-stream subscriber 46 is paged by the SSO 40 and directed to the MTSO 41, as follows. When an incoming call from the PSTN to the A-stream subscriber 46 reaches the SSO 40, the SSO simultaneously pages the called subscriber on the A-stream with its dedicated CCH and forwards the incoming call to the MTSO 41 via the interoffice trunks 48. The called subscriber, i.e. mobile 46, receiving the page message on the SSO's CCH responds to the message. The A-stream mobile 46 sends its page response on the A-stream access-only CCHs controlled by the MTSO 41. During this time, the MTSO has received the forwarded incoming call from the SSO via interoffice trunks 48 and has gone through its internal paging process and "sends out" a page message on the above mentioned disabled or "mistuned" paging channel to the attention of A-stream mobile 46. Note that since the paging message is disabled or sent on a "mistuned" paging channel, the A-stream subscriber will not receive the page message. When the subscriber's page response is received at the MTSO, which is really in response to the SSO's paging message, the MTSO proceeds to set up the call. Thus, the MTSO operates as before the upgrade, that is, as if it had control of the call set-up and service. The subscriber does not see any degradation in service and does not know whether calls are handled by the MTSO or the SSO.

In effect, any A-stream mobile will be directed to attempt system access (subscriber response or page response) only on the MTSO's access-only CCHs. These A-stream mobiles get the NEWACC message in the SSO's paging/access channels. The NEWACC message directs the A-stream mobiles to use the MTSO's access only CCHs for access attempts. The B-stream mobiles monitor the same paging/access channels, but they don't listen to the A-stream so they don't hear the NEWACC messages.

I claim:

1. A method for providing an overlay cellular network and operating in tandem said overlay cellular network with an existing cellular network to increase said existing cellular network's capacity, said existing network having a plurality of cells with at least a first base station in each cell connected to a mobile telephone switching office (MTSO) connected to a public switched telephone network (PSTN), said MTSO having paging/access control channels, said method comprising the steps of:

a) providing a second switching office (SSO), said SSO having paging/access control channels;
  b) coupling in and out trunks between said SSO and said PSTN;
  c) coupling inter-office trunks between said SSO and said MTSO;
  d) decoupling incoming trunks between said MTSO and said PSTN;
  e) providing a second base station in each cell, said second base station being associated with said SSO;
  f) assigning for each cell associated with said MTSO a modified paging/access control channel such that said paging channel is modified to operate on mistuned frequencies so as to be inaccessible by any mobile subscriber;
  g) assigning for each cell associated with said SSO a paging/access control channel;
  h) monitoring incoming and outgoing calls to and from mobile subscribers to identify a first group of subscribers having a Mobile Identification Number (MIN) with a least significant bit equal to a first binary number;
  i) monitoring incoming and outgoing calls to and from mobile subscribers to identify a second group of subscribers having a MIN with a least significant bit equal to a second binary number;
  j) intercepting, at said SSO, outgoing calls from a mobile subscriber in said first group for service by said MTSO; and
  k) intercepting, at said SSO, incoming and outgoing calls to and from a mobile subscriber in said second group for set up and service by said SSO and incoming calls from said PSTN to a mobile subscriber in said first group for transfer to said MTSO via one of said inter-office trunks.

2. A method for providing an overlay cellular network and operating in tandem said overlay cellular network with an existing cellular network to increase said existing cellular network's capacity, said existing network having a plurality of cells with at least a first base station in each cell connected to a mobile telephone switching office (MTSO) connected to a public switched telephone network (PSTN), said MTSO having paging/access control channels, said method comprising the steps of:

a) providing a second switching office (SSO), said SSO having paging/access control channels;
  b) coupling in and out trunks between said SSO and said PSTN;
  c) coupling inter-office trunks between said SSO and said MTSO;
  d) decoupling incoming trunks between said MTSO and said PSTN;
  d) placing in each cell, new base station associated with said SSO, along with the base station associated with the MTSO;
  e) assigning a first group of subscribers having a Mobile Identification Number (MIN) with a least significant bit equal to a first binary number for service with the MTSO;
  f) assigning a second group of subscribers having a MIN with a least significant bit equal to a second binary number for service with said SSO;
  g) assigning for each cell a paging/access control channel associated with said SSO, such that calls directed to said first or second group of subscribers and calls originating from said second group of subscribers are set-up by said SSO;
  h) assigning for each cell an access/paging control channel associated with said MTSO, such that calls originating from said first group of subscribers are set-up by said MTSO;
  i) monitoring incoming calls from said PSTN to subscribers from said first group;
  j) capturing one of the incoming calls;
  k) paging the called subscriber on said paging/access control channel associated with said SSO;
  l) simultaneously forwarding said captured incoming call to said MTSO along said inter-office trunks connecting said SSO and said MTSO;
  m) forwarding to the called subscriber a message to tune to an access control channel assigned to said MTSO;
  n) receiving at said MTSO the incoming call from said SSO through said interoffice trunks;
  o) paging the called subscriber on said modified paging/access control channel associated with said MTSO;
  p) receiving at said MTSO the paging response from the called subscriber; and
  q) servicing the incoming call on a voice channel assigned to said MTSO;

3. A method for providing an overlay cellular network and operating in tandem said overlay cellular network with an existing cellular network to increase said existing cellular network's capacity, said existing network having a plurality of cells with at least a first base station in each cell connected to a mobile telephone switching office (MTSO) connected to a public switched telephone network (PSTN), said MTSO having paging/access control channels, said method comprising the steps of:

a) providing a second switching office (SSO), said SSO having paging/access control channels;
  b) coupling in and out trunks between said SSO and said PSTN;
  c) coupling inter-office trunks between said SSO and said MTSO;
  d) decoupling incoming trunks between said MTSO and said PSTN;
  e) providing a second base station in each cell, said second base station being associated with said SSO;
  f) assigning for each cell associated with said SSO a paging/access control channel;
  g) monitoring incoming and outgoing call to and from mobile subscribers to identify a first group of subscribers having a Mobile Identification Number (MIN) with a least significant bit equal to a first binary number;
  h) monitoring incoming and outgoing calls to and from mobile subscribers to identify a second group of subscribers having a MIN with a least significant bit equal to a second binary number;
  i) assigning for each cell associated with said MTSO a modified paging/access control channel such that said paging channel is modified to prevent subscribers from said first group and said second group from scanning and locking onto any paging channels from said MTSO;
  j) intercepting, at said SSO, outgoing calls from a mobile subscriber in said first group for service by said MTSO; and
  k) intercepting, at said SSO, incoming and outgoing calls to and from a mobile subscriber in said second group for set up and service by said SSO and incoming calls from said PSTN to a mobile subscriber in said first group for transfer to said MTSO via one of said interoffice trunks.

4. A method as in claim 3, wherein said step "i" includes the step of:
  a) disabling the paging channels associated with said MTSO to prevent subscribers from said first group from scanning and locking onto any paging channels from said MTSO.

5. A method as in claim 3 wherein said step "i" includes the step of:
  a) mistuning the paging/access control channels associated with said MTSO such that they operate in frequencies outside of those required for scanning and locking on a paging channel from said MTSO.

6. A method as in claim 3 wherein said step "j" includes the steps of:
  a) monitoring the access channels of said paging/access channels associated with said SSO;
  b) capturing a call attempt from said one of said first group of subscriber;
  c) forwarding to the aforesaid subscriber a message on said control channel to tune to an access control channel assigned to said MTSO; and
  d) allowing said MTSO to answer and service said call attempt.

7. A method as in claim 3 wherein said step "k" includes the steps of:
  a) monitoring incoming calls from said PSTN to subscribers from said first group;
  b) capturing one of the incoming calls;
  c) paging the called subscriber on said paging/access control channel associated with said SSO;
  d) simultaneously forwarding said captured incoming call to said MTSO along said inter-office trunks connecting said SSO and said MTSO;
  e) forwarding to the called subscriber a message to tune to an access control channel assigned to said MTSO;
  f) receiving at said MTSO the incoming call from said SSO through said interoffice trunks;
  g) paging the called subscriber on said modified paging/access control channel associated with said MTSO;
  h) receiving at said MTSO the paging response from the called subscriber; and
  i) servicing the incoming call on a voice channel assigned to said MTSO.

* * * * *